(12) United States Patent
Strelchun

(10) Patent No.: US 6,362,476 B1
(45) Date of Patent: Mar. 26, 2002

(54) OPTICAL SPECTRUM ANALYZER WAVELENGTH NON-LINEARITY MEASUREMENT SYSTEM

(75) Inventor: Thomas Francis Strelchun, Mertztown, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/399,856

(22) Filed: Sep. 21, 1999

(51) Int. Cl.$^7$ .................................................. G01J 3/02
(52) U.S. Cl. ................................. 250/339.09; 356/328
(58) Field of Search ........................... 250/339.09, 207; 356/328, 326

(56) References Cited

U.S. PATENT DOCUMENTS

| | | |
|---|---|---|
| 4,664,522 A | 5/1987 | LeFebre |
| 4,900,113 A | 2/1990 | Hatori |
| 5,027,055 A | 6/1991 | Lee et al. |
| 5,066,126 A | 11/1991 | Hatori |
| 5,177,560 A | 1/1993 | Stimple et al. |
| 5,767,966 A | 6/1998 | Iwasaki |
| 5,784,159 A | 7/1998 | Iwasaki |
| 5,825,484 A | 10/1998 | Iwasaki |
| 6,160,659 A * | 12/2000 | Kinoshita .................. 359/337 |

* cited by examiner

*Primary Examiner*—Constantine Hannaher
*Assistant Examiner*—Otilia Gabor
(74) *Attorney, Agent, or Firm*—Wendy W. Koba

(57) ABSTRACT

A measurement tool for assessing the wavelength linearity of an optical spectrum analyzer utilizes the linear skirt slope region of the included resolution bandwidth filter. The input wavelength is swept from a predetermined start value to a predetermined stop value, and the associated amplitude is recorded. The insertion loss associated with the system is first determined so that this loss can be removed from the recorded amplitude values. By knowing the skirt slope and the measured amplitudes, the wavelength offset can be determined.

7 Claims, 4 Drawing Sheets

OPTICAL SPECTRUM ANALYZER WAVELENGTH NON-LINEARITY MEASUREMENT SYSTEM

BACKGROUND OF THE INVENTION

The present invention relates to an arrangement for measuring the wavelength-dependent non-linearity of an optical spectrum analyzer (OSA) and, more particularly, to an arrangement which utilizes the essentially linear skirt portion of the OSA's resolution bandwidth filter to assess the linearity of the OSA itself.

BACKGROUND OF THE INVENTION

Optical spectrum analyzers are used for analyzing the output light beams from lasers, light-emitting diodes and other light sources. Optical spectrum analyzers are particularly useful for analyzing light sources for optical telecommunications, where it is preferable to ensure that the optical carrier includes only a single, spectrally pure wavelength. In optical spectrum analyzers, the light intensity of a light beam is displayed as a function of wavelength over a predetermined wavelength range. Parameters of importance include wavelength range, wavelength and amplitude accuracy, sensitivity, resolution, measurement speed, polarization insensitivity and dynamic range.

Optical spectrum analyzers frequently use a diffraction grating for separating the light beam to be analyzed into its component wavelengths. The input light beam to be analyzed is collimated and is directed at the diffraction grating. The light beam is spatially dispersed by the grating, since different wavelengths are diffracted at different angles. A resolution bandwidth filter is then used to provide an output at only the desired wavelength(s).

The results obtained from the optical spectrum analyzer are themselves limited by the accuracy of the components with the optical spectrum analyzer. Indeed, the wavelength non-linearity of a swept tunable filter with the optical spectrum analyzer adds uncertainty to any measurements being made by the analyzer. Prior attempts at deducing the wavelength non-linearity of an optical spectrum analyzer included using the peak level of the filter response. Unfortunately, the resolution of such a technique is limited due to the "flat top" response of the resolution bandwidth filter profile.

Thus, a need remains for an improved technique for assessing the non-linearity of an optical spectrum analyzer.

SUMMARY OF THE INVENTION

The need remaining in the prior art is addressed by the present invention, which relates to an arrangement for measuring the wavelength-dependent non-linearity of an optical spectrum analyzer (OSA) and, more particularly, to an arrangement which utilizes the essentially linear skirt portion of the OSA's resolution bandwidth filter to assess the linearity of the OSA itself.

In accordance with the present invention, a wavelength source is coupled to the monochromator input of the OSA and an optical power meter is coupled to the monochromator output of the OSA. The wavelength source is capable of producing a range of optical signals from a predetermined "start" wavelength (for example, 1530 nm) to a predetermined "stop" wavelength (for example, 1570 nm). The insertion loss of the spectrum analyzer, over the wavelength range of interest, is first determined and stored in an array. The source wavelength is then measured over a span sufficient to measure the amplitude±10 dB from the peak value. The diffraction grating is then stepped from a first one of these "edge" values and across the peak to determine the 3 dB point. The wavelength and amplitude are recorded at each step from the "start" wavelength to the "stop" wavelength.

In order to ascertain the non-linearity of the optical spectrum analyzer, the insertion loss value is first subtracted from its associated amplitude measurement, the resultant corrected amplitude then be normalized against the prior recorded peak value. The skirt slope (in percent/pm) is then determined. The actual "wavelength offset" can then be ascertained, as a function of wavelength by subtracting the peak amplitude value from the normalized value and dividing by the skirt slope.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
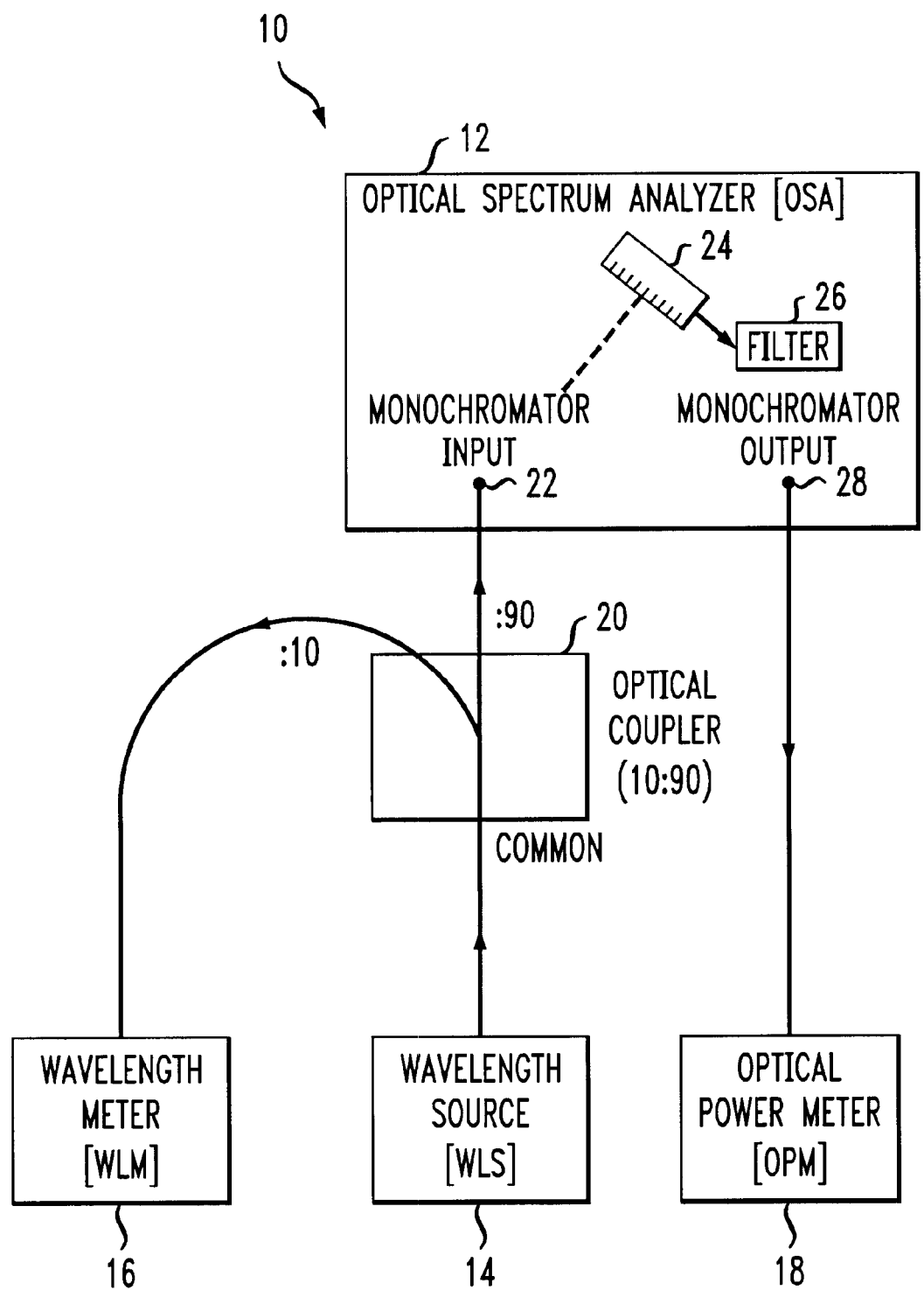
FIG. 1 Illustrates an exemplary test set up that can be used in accordance with the present invention to assess the non-linearity of an optical spectrum analyzer.

An exemplary linearity test arrangement 10 for an optical spectrum analyzer is illustrated in FIG. 1. In particular, test arrangement 10 includes an optical spectrum analyzer 12 that is being tested for linearity, in association with a wavelength source 14, a wavelength meter 16 and optical power meter 18. An optical splitter 20 is coupled at its input to the output of the wavelength source and functions to provide a first output optical signal to the monochromator input 22 of optical spectrum analyzer 12 and a second output optical signal to wavelength meter 16. In general, a 10:90 split may be used, with 90% of the input signal from wavelength source 14 applied as an input to monochromator input 22 and 10% of the input signal from wavelength source 14 applied as an input to wavelength meter 16. As discussed above and is well-known in the art, optical spectrum analyzer comprises a diffraction grating 24 and resolution bandwidth filter 26 for separating the input optical signal into the various wavelength components and thus providing as an output signal (denoted as monochromator output 28, coupled as an input to optical power meter 18) the various wavelengths in the "spectrum".

In accordance with the present invention, the linear response of optical spectrum analyzer 12 as a function of wavelength can be determined by defining the skirt slope (linear) of resolution bandwidth filter 26, determining the system insertion loss and peak amplitude at each wavelength, and then using this information to calculate the "wavelength offset" at each measured wavelength. Once the "wavelength offset" is known, this variation may be factored into the subsequent measurements performed by the optical spectrum analyzer. Alternatively, this information regarding wavelength offset may be used to adjust the settings of the diffraction grating and resolution bandwidth filter within the optical spectrum analyzer so as to improve the linearity of the spectrum analyzer.

Figure 2:
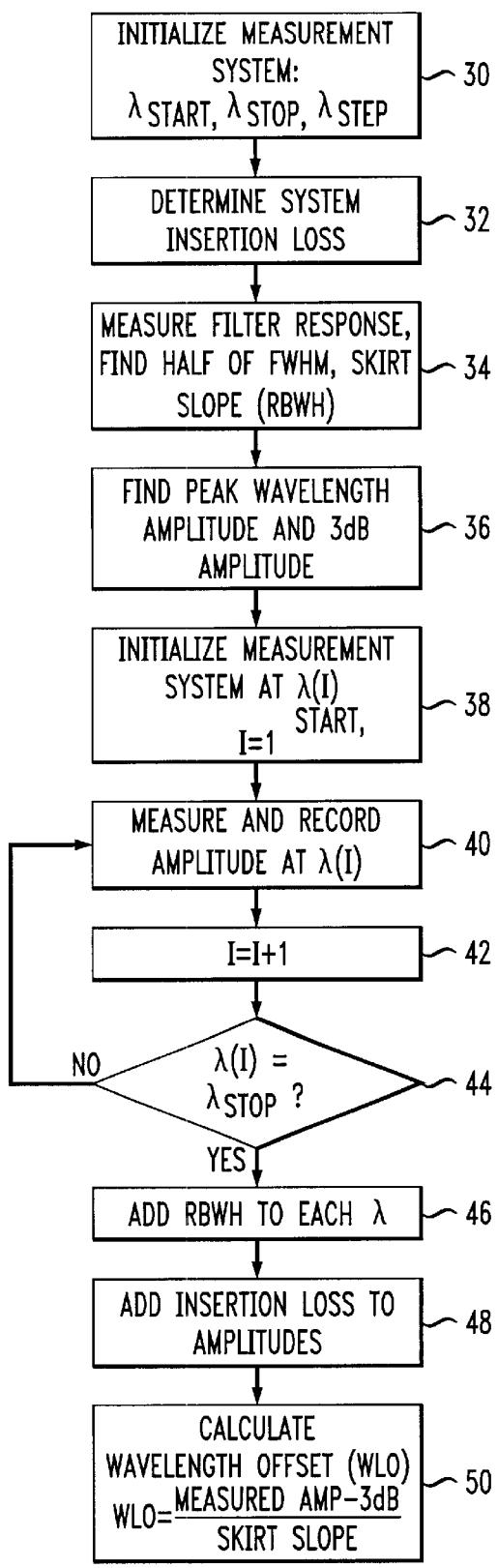
FIG. 2 contains a flow chart illustrating the linearity measurement process of the present invention.

In accordance with the present invention, the first step in assessing the nonlinearity (i.e., offset in measurement as a function of wavelength) of an optical spectrum analyzer is to determine the wavelength range that will be used for the testing. FIG. 2 contains a flow chart of the measurement process of the present invention, block 30 defining the initialization step of determining the "start" wavelength $\lambda_{start}$, the "stop" wavelength $\lambda_{stop}$, and the wavelength increment, $\Delta\lambda$, to be used between each measurement step. In an exemplary embodiment, the following values may be used: $\lambda_{start}$=1530 nm, $\lambda_{stop}$=1570 nm, and $\Delta\lambda$=10 pm (i.e., 0.01 nm).

Once the wavelength range of interest is determined, the system insertion loss is next determined (block 32), so that this loss may ultimately be subtracted from later measured power values. In this case, the loss attributed to both optical spectrum analyzer 12 and optical power meter 18 is determined. Starting from $\lambda_{start}$, diffraction grating 24 is stepped (using $\Delta\lambda$) by using a 1 nm resolution bandwidth filter 26. At each increment between $\lambda_{start}$ and $\lambda_{stop}$, the optical power, $P_{loss}$, is measured using power meter 18 and the wavelength $\lambda_{loss}$ is measured using wavelength meter 16. The power insertion loss is then retained to be used during a final calculation of non-linearity.

Figure 3:
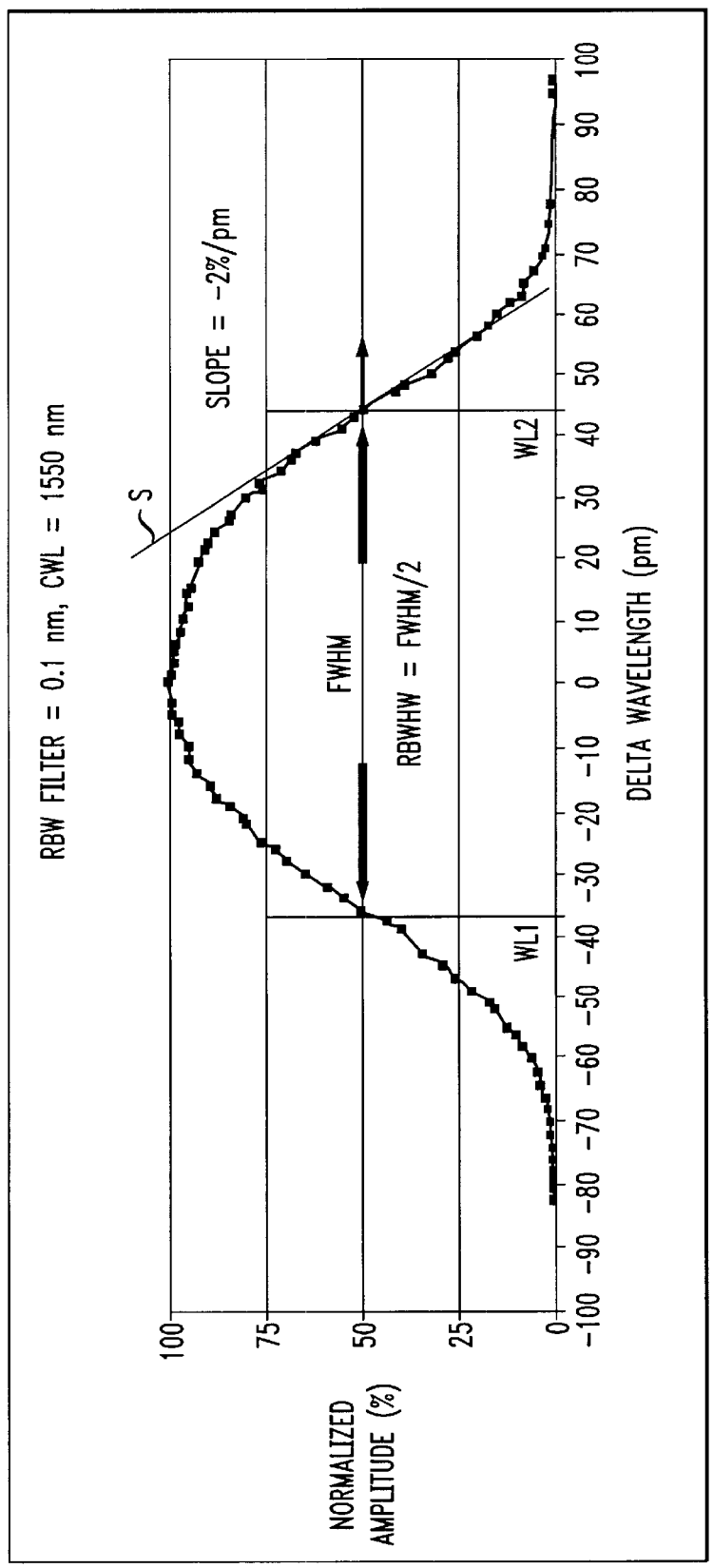
FIG. 3 is a graph of an exemplary optical spectrum analyzer trace, illustrating the output amplitude as a function of wavelength.

Following the determination of the insertion loss, the bandwidth of filter 26 is set at a value which allows for accurate measurements to be made at the steps between $\lambda_{start}$ and $\lambda_{stop}$, with 0.1 nm being an appropriate nominal value. The half-width value of the filter response, denoted RBWHW, is defined as one-half of resolution bandwidth filter 34 "full width half maximum" (FWHM) amplitude, determined by sweeping the wavelength across the fixed filter (block 34). FIG. 3 illustrates both the FWMH and RBWHW values for an exemplary resolution bandwidth filter having a bandwidth of 0.1 nm. The "flat top" central portion of the filter characteristic is shown in FIG. 3, as well as the essentially linear "skirt" region, denoted by the letter "S". As shown in the diagram, the skirt region exhibits a linearity of approximately −2%/pm. This value for the slope of the skirt region will be used in determining the wavelength offset associated with the optical spectrum analyzer.

Figure 4:
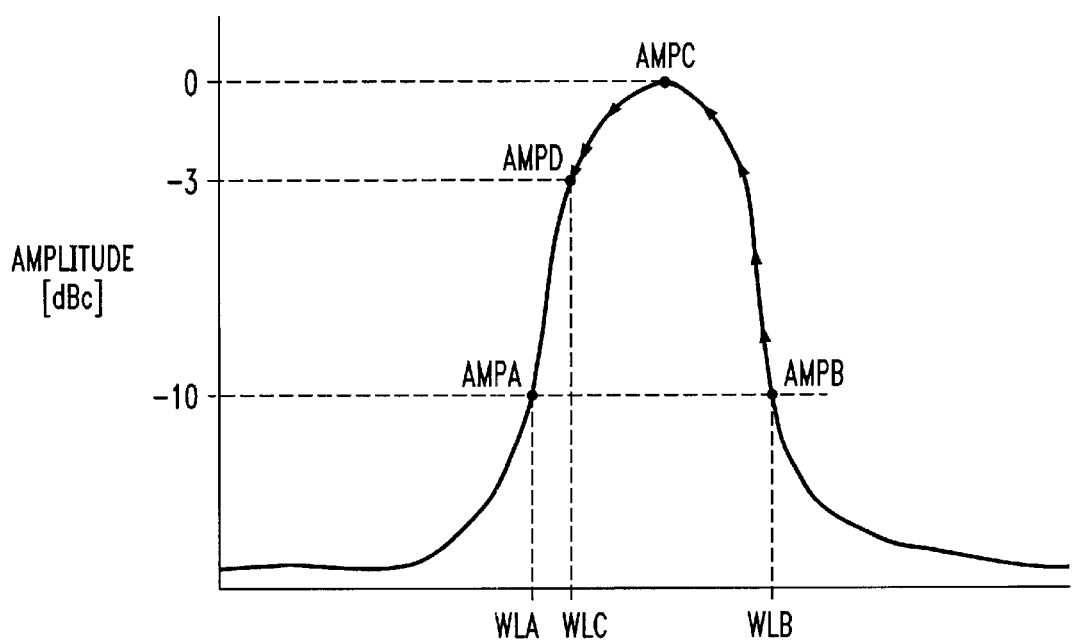
FIG. 4 is a graph of the linearity measurement, illustrating in particular the normalized amplitude as a function of wavelength offset, shown in particular, the linear skirt slope region.

The wavelength from wavelength source 14 is then measured using optical spectrum analyzer 12 (see block 36, FIG. 2), measuring the wavelength with sufficient span to capture values corresponding with a 10 dB range on either side of the peak value, as shown in FIG. 4. Referring to FIG. 4, the "short" wavelength −10 dB value is designated $\lambda_A$ and the "long" wavelength −10 dB value is designated $\lambda_B$, with the peak value denoted $\lambda_C$. Starting from the long wavelength value $\lambda_B$, diffraction grating 24 can be stepped (in 2 pm intervals, for example), as shown in FIG. 4, to ascertain both the amplitude associated with peak value $\lambda_C$ and the wavelength, denoted $\lambda_D$, associated with the −3 dB point beyond this peak value. This −3 dB point is associated with the leading edge of filter 24 and, as discussed below, will be subtracted from a measured amplitude value when determining the wavelength offset (non-linearity) of optical spectrum analyzer 12.

With all of these preliminary values determined, a set of steps (indicated by blocks 38–44 in FIG. 2) is next initiated to measure amplitude values associated with each incremental wavelength value between $\lambda_{start}$ and $\lambda_{stop}$. In particular, the measurements begin at $\lambda_{start}$ (for example, 1530 nm), where the amplitude measured by optical power meter 18 is recorded as $P_{start}$. The optical spectrum analyzer wavelength pre-selector set point wavelength, defined as $\lambda_{set}$, is also determined, where $\Delta\lambda_{off}$ is defined as $\lambda_{set}-\lambda_{start}$.

The source wavelength is then incremented by $\Delta\lambda$, the actual wavelength being measured and recorded by wavelength meter 16. The different grating wavelength is then incremented by $\Delta\lambda+\Delta\lambda_{off}$ and the amplitude output at optical power meter 18 is measured for this incremented wavelength. The process of incrementing the wavelength and measuring the amplitude until the wavelength value of $\lambda_{stop}$ is reached. At this point, an array of information has been recorded, with a particular amplitude value A($\lambda$) associated with each incremental wavelength value between $\lambda_{start}$ and $\lambda_{stop}$.

In order to shift the diffraction grating wavelength set point reference to the center of the passband of filter 26, the calculated RBWHW value is added to each wavelength value in the array created during the measurement process (block 46). The amplitude "correction" is then made by adding the earlier calculated insertion loss values to the measured amplitude values, obtaining $A_{normal}(\lambda)$ (block 48). Therefore, by applying both these corrections to both wavelength and amplitude, a precise measurement of the spectrum analyzer non-linearity can be achieved. The data array (i.e., amplitude as a function of wavelength) can then be normalized using the peak value $\lambda_C$ as 100%.

Figure 5:
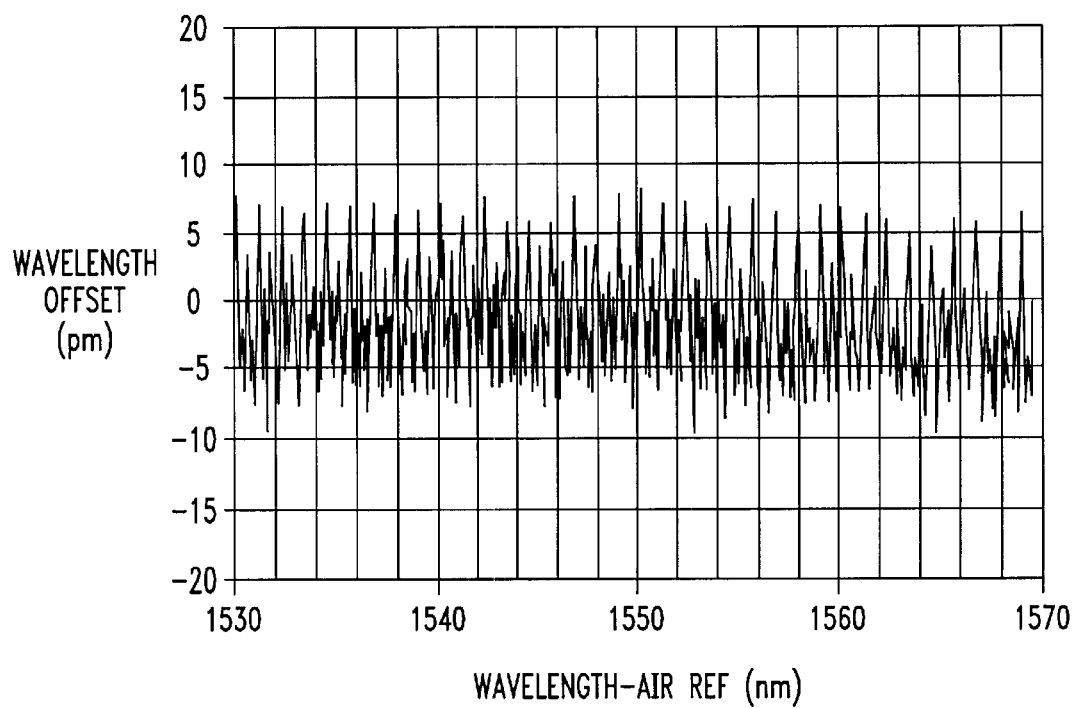
FIG. 5 is a graph illustrating wavelength offset as a function of input wavelength.

Once all of this data has been collected, the wavelength offset at each diffraction grating set point, defined as $\lambda_{offset}$, can be measured as follows (block 50 of FIG. 2):

$$\lambda_{offset}=(A_{normal}(\lambda)-A(\lambda_D))/S,$$

where "S" is the slope of the filter characteristic as determined above. It is to be understood that $\lambda_{offset}$ is separately calculated for each wavelength between $\lambda_{start}$ and $\lambda_{stop}$. FIG. 5 contains an exemplary plot $\lambda_{offset}$ as a function of wavelength (across an exemplary range of 1530 nm to 1570 nm). For the particular spectrum analyzer that was evaluated, the offset ranged from approximately +8 pm to −10 pm, as a function of wavelength.

While there has been shown and described what is at present considered to be the preferred embodiment of the present invention, it will be obvious to those skilled in the art that various changes and modifications may be made therein without departing from the scope of the invention as defined by the appended claims.

What is claimed is:

1. An arrangement for measuring the wavelength linearity of an optical spectrum analyzer, the optical spectrum analyzer including a diffraction grating and resolution bandwidth filter, the resolution bandwidth filter exhibiting a linear skirt slope expressed as a percentage/pm, the arrangement comprising a wavelength source for supplying an input optical signal at a predetermined wavelength;

a wavelength meter for measuring the wavelength of the applied input optical signal;

an optical splitter for dividing the input optical signal from the wavelength source between the wavelength meter and an input of the optical spectrum analyzer; and an optical power meter coupled to the optical signal output from said optical spectrum analyzer, said optical power meter for recording insertion loss associated with the combination of the optical spectrum analyzer and the optical power meter, and determining an optical wavelength offset at each wavelength across the range of the optical spectrum analyzer by subtracting a predetermined 3 dB amplitude from a recorded amplitude at each wavelength and dividing the difference by the skirt slope value.

2. An arrangement as defined in claim 1 wherein the optical splitter is approximately a 10:90 splitter, providing 90% of the input optical signal to the optical spectrum analyzer.

3. An arrangement as defined in claim 1 wherein the linearity of an optical spectrum analyzer is measured over a wavelength range of approximately 1530 nm to 1570 nm.

4. An arrangement as defined in claim 1 wherein the resolution bandwidth filter skirt slope is within the range of 2.0 to 2.5%/pm.

5. A method of measuring the wavelength linearity of an optical spectrum analyzer the method comprising the steps of:

a) providing an optical spectrum analyzer including a diffraction grating and a resolution bandwidth filter, the resolution bandwidth filter exhibiting a linear skirt slope region;

b) determining a "start" wavelength, a "stop" wavelength, and a "step" wavelength to be used for measuring the linearity of the provided optical spectrum analyzer;

c) determining the insertion loss associated with said spectrum analyzer over the wavelength range from the start wavelength to the stop wavelength, providing a measure of insertion loss at each step wavelength therebetween;

d) measuring amplitude output associated with the start wavelength to determine a peak amplitude value and a 3 dB amplitude value;

e) determining an input wavelength offset by subtracting a measured wavelength reading from the predetermined start wavelength value;

f) measuring, at the output of the optical spectrum analyzer, the amplitude associated with the start wavelength;

g) incrementing the input wavelength by the step value;

h) setting the diffraction grating wavelength to the incremented value plus the offset calculated in step e);

i) repeating steps f)–h) until a measurement for the stop wavelength is made;

j) modifying the measurements recorded in step f) by the insertion loss values measured in step c);

k) determining the wavelength offset at each step by subtracting the measured 3 dB amplitude from each amplitude modified in step j), then dividing the difference by the exhibited skirt slope of the filter, the result being defined as the wavelength offset.

6. The method as defined in claim 5 wherein in performing step b), the start wavelength is approximately 1530 nm, the stop wavelength is approximately 1570 nm, and the step increment is 10 pm.

7. The method as defined in claim 6 wherein in performing step a), an optical spectrum analyzer including a filter exhibiting a skirt slope in the range of 2.0–2.5%/pm is provided.

* * * * *